US006988081B2

(12) United States Patent
Halpern

(10) Patent No.: US 6,988,081 B2
(45) **Date of Patent: *Jan. 17, 2006**

(54) AUTOMATED METHODS AND APPARATUS FOR PROGRAMMED PERIODIC REPLENISHMENT OF PRINCIPAL WITH ANNUAL ADJUSTMENT TO FUTURE INTEREST RATES

(76) Inventor: Richard G. Halpern, 44 Fernhill Rd., Springfield, NJ (US) 07081

(*) Notice: Subject to any disclaimer, the term of this patent is extended or adjusted under 35 U.S.C. 154(b) by 745 days.

This patent is subject to a terminal disclaimer.

(21) Appl. No.: 09/977,224

(22) Filed: Oct. 16, 2001

(65) Prior Publication Data

US 2002/0035532 A1 Mar. 21, 2002

Related U.S. Application Data

(63) Continuation of application No. 09/105,070, filed on Jun. 26, 1998.

(60) Provisional application No. 60/051,130, filed on Jun. 27, 1997.

(51) Int. Cl.
*G06F 17/60* (2006.01)

(52) U.S. Cl. ........................................ 705/36; 705/37

(58) Field of Classification Search .................... 705/1, 705/4, 35–40
See application file for complete search history.

(56) References Cited

U.S. PATENT DOCUMENTS

| | | | | |
|---|---|---|---|---|
| 4,742,457 | A * | 5/1988 | Leon et al. | 705/35 |
| 5,926,800 | A * | 7/1999 | Baronowski et al. | 705/35 |
| 5,933,815 | A * | 8/1999 | Golden | 705/35 |

FOREIGN PATENT DOCUMENTS

| | | |
|---|---|---|
| WO | WO 97/36253 | * 10/1996 |
| WO | WO 97/16897 | * 5/1997 |

OTHER PUBLICATIONS

Basralian, Joseph, "Up the Bond Staircase", Financial World, vol. 163, Issue 21, Oct. 11, 1994.*

Clauterie, Terrence M. et al., "A Note On Quantifying the Tax Advantage of Structured Versus Lump Sum Settlements", Journal of Legal Economics, Winter 1996/1997, vol. 6, Issue 3, 1996.*

"Up the Bond Staircase" Financial World; New York, Oct. 11, 1994, ISSN: 001520640.*

* cited by examiner

*Primary Examiner*—Frantzy Poinvil
(74) *Attorney, Agent, or Firm*—Finnegan, Henderson, Farabow, Garrett & Dunner, LLP

(57) ABSTRACT

An automatic system for managing an initial finding amount maintains an initial structure divided between two term investment vehicles, and reinvests the maturities each new term to maintain the initial funding amount.

4 Claims, 5 Drawing Sheets

AUTOMATED METHODS AND APPARATUS FOR PROGRAMMED PERIODIC REPLENISHMENT OF PRINCIPAL WITH ANNUAL ADJUSTMENT TO FUTURE INTEREST RATES

I. RELATIONSHIP TO OTHER APPLICATIONS

The application claims the benefit of provisional application 60/051,130, filed Jun. 27, 1997, which is hereby incorporated by reference.

II. BACKGROUND OF THE INVENTION

This invention relates generally to automated systems for asset management, and more specifically to a system for managing capital to ensure a future payout.

A structured settlement (more appropriately referred to as the periodic payment of damages) is a critical tool in the settlement of physical injury litigation. Until the 1990's, structured settlements were predominantly funded by life insurance company annuities. Since 1991, however, there has been a rash of life insurance company failures within the ranks of carriers issuing structured settlement annuities.

This has led to an increasing usage of United States Treasury Bonds as the funding instrument. This is permitted by Section 130(d ) of the Internal Revenue Code of 1986, as amended ("the Code"), titled "Qualified Funding Asset." The first sentence of Section 130(d) makes it clear as to what type of obligation can be used in funding a Section 130 structured settlement. It states that "for purposes of this section the term 'qualified funding asset' means any annuity contract issued by a company licensed to do business as an insurance company under the laws of any state, or any obligation of the United States . . . . " This language provides that the only alternative to annuities is an obligation of the United States (e.g., United States Treasury Bonds).

In recent years, the structured settlement marketplace has felt a significant need for a safer alternative to life insurance company-issued annuity products. Because the safest fixed income investment may well be United States Treasury Bonds, The Halpern Group developed the first United States Treasury Bond Government Securities Periodic Payment Trust ("Structured Settlement Trust"), which was made available to the public in January of 1992. The purpose of this trust was to eliminate the two key areas of principal risk for the plaintiff: (1) the risk of commercial failure, and (2) risk of failure of the "Section 130 Qualified Assignee." With regard to the first point, United States Treasury Bonds have no risk of commercial failure, as does an annuity from a life insurance company. With regard to the second point, in many transactions prevalent in the marketplace, the Qualified Assignee is a shell corporation specifically established by the annuity issuer to do nothing more than to serve as an Assignee. Generally, the only assets of such a shell corporation are the annuities being held to satisfy the periodic payment obligations. The problem with this arrangement is that corporations of a single purpose or shell variety have a tendency to fail, creating an additional risk factor for the profoundly injured victim. Even state Guarantee Funds provide no direct protection to the plaintiff.

Legislative changes have not fully addressed this second problem. The Technical and Miscellaneous Revenue Act of 1988 amended Section 130 of the Code to allow plaintiffs greater rights than those of a general creditor. Generally speaking, this has been interpreted to be a security interest in the underlying qualified funding asset as defined in Section 130(d).

The tax implications if that interest ever had to be activated are not clear, however. Therefore, the best way to serve this community of profoundly injured individuals would be to provide a product that was safe enough to render issues of assignee failure moot.

The Structured Settlement Trust, which received approval as in compliance with Section 130 of the Code by the Internal Revenue Service in Private Letter Ruling 9703038, removed the risk of commercial failure of an insurer by not using annuities as funding vehicles. The Trust further eliminates the risk of failure of the assignee by using a trust instead of a corporate entity.

The Structured Settlement Trust, however, does not address interest rate risk. This risk manifests as a diminishment of periodic payment purchasing power due to inflation in the future because those payments cannot adjust to prevailing interest rates in future economic situations. This is a very wide-felt need.

In response to this need, Transamerica Occidental Life introduced an annuity whose payout was tied to future increases in the Consumer Price Index ("CPI"). This product, which has been approved by the internal Revenue Service, has not been successful, is price-based on the future CPI may be, by taking into account, today, an actuarial estimate of the CPI over the next several decades. The end result is that a $1000 per month benefit of the CPI index product costs approximately three times as much as the same $1000 per month benefit of Transamerica's normal level payout.

The plaintiff/injured party is then faced with a choice of a monthly benefit that will rise in the future based on the CPI versus a level benefit that will be fixed and determinable in the future that initially costs three times as much as the variable benefit that would be provided by the CPI product. Although tort victims can be protected against risk of commercial failure, they are still subject to interest rate risk.

Section 130(c)(2)(A) of the Code states that periodic payments must be "fixed and determinable as to amount and time of payment." This is followed by Section 130(c)(2)(B) which states that "such periodic payments cannot be accelerated, deferred, increased, or decreased by the recipient of such payments." It therefore becomes critical, should there be a variable future income stream, to be able to show that at no time did the payment recipient have any ability to increase, decrease, accelerate or defer any payment. The ability or right to do so would trigger the application of the constructive receipt doctrine. Therefore, any such solution should be devoid of human input.

Currently, United States Treasury Bonds are only issued for periods up to 30 years. This poses another problem because it is usually important with a structured settlement that the income stream be payable for the life of the injured party.

Another problem in the marketplace is that a structured settlement that is non-life contingent (i.e., guaranteed for up to and including 50 years) becomes a taxable asset at death in the estate of the payment recipient. Such an asset is taxed according to the present value at death of the unpaid benefits determined by government tables and such tax is due within nine months of death. For example, a profoundly injured infant receives a structured settlement paying $10,000 per month for 30 years and life thereafter. If he dies in the first year, the guaranteed portion of $10,000 per month will still be paid for the next 29 plus years, obviously yielding a very large present value. Nonetheless, the tax on that present value is due within nine months of death. This causes a situation that the IRS and the estate of the deceased find troublesome. Because the estate will probably not be able to pay the tax due within nine months in the form of a lump-sum, the IRS would have no option but to attach the future income stream until the appropriate amount of tax plus interest has been paid. The problem with this is that, at the present time, the interest on estate taxes due would be calculated at a rate between 9–10% a year, but the yield on the structured settlement would be closer to 5–6½%. The interest obligation would exceed the payment stream and the payments will never catch up to the interest.

III. SUMMARY OF THE INVENTION

To provide an improvement over these processes, a method, consistent with this invention, automatically manages an initial funding amount to achieve a future rate of return that will be consistent with future economic conditions without diminishing principal. The method comprises the steps, performed by a data processor, of receiving input values for the initial funding amount, a cost of a primary term investment vehicle, a cost of a secondary term investment vehicle and any front end load for the primary and secondary term investment vehicles; creating an initial investment structure by splitting the initial funding amount into a predetermined number of portions, spreading the portions over the predetermined number of initial investment terms, and dividing each portion between the primary and secondary term investment vehicles such that for each term, the sum of the values for the primary and secondary term investment vehicles at the end of the corresponding term equals the portion for that term; and maintaining an ongoing investment structure for an additional term as each portion of the initial funding amount matures at the end of the corresponding investment term by determining a reinvestment of gross proceeds for an additional investment term. The step of creating the initial investment structure includes the substeps of calculating the amount of the portions needed to cover any front end load, determining a factor to divide each portion, less the calculated front end load, of the initial funding amount between the primary and secondary investment vehicles, and creating communications to implement the initial investment structure. The step of maintaining the investment structure including the substeps of receiving updated input values for the cost of the primary investment vehicle and the cost of the secondary investment vehicle, matching the secondary investment vehicle to the primary investment vehicle to maintain a consistent level of reinvestment, and scheduling the automatic purchasing of primary and secondary term investment vehicles as determined after matching.

Both the foregoing general description and the following detailed description are exemplary and explanatory only, and do not restrict the invention claimed. The accompanying drawings, which are incorporated in and constitute a part of this specification, illustrate some systems and methods consistent with the invention and, together with the description, explain the principles of the invention.

IV. BRIEF DESCRIPTION OF THE DRAWINGS

V. DETAILED DESCRIPTION OF THE PREFERRED IMPLEMENTATION

A method consistent with this invention involves investing the initial finding amount (i.e., the entire amount used to fund the structured settlement) in United States Treasury Bonds ("Coupon Bonds") and, where necessary, United States Treasury Zero Coupon Bonds ("Strips"). For illustration purposes only, United States Treasury Bonds is the investment vehicle chosen, but the procedure may be applied to various other investments including Municipal Bonds discussed below. Data processing systems are used because of the rapid response needed and the recognition that, properly implemented, this process requires a great deal of computing power.

Figure 2:
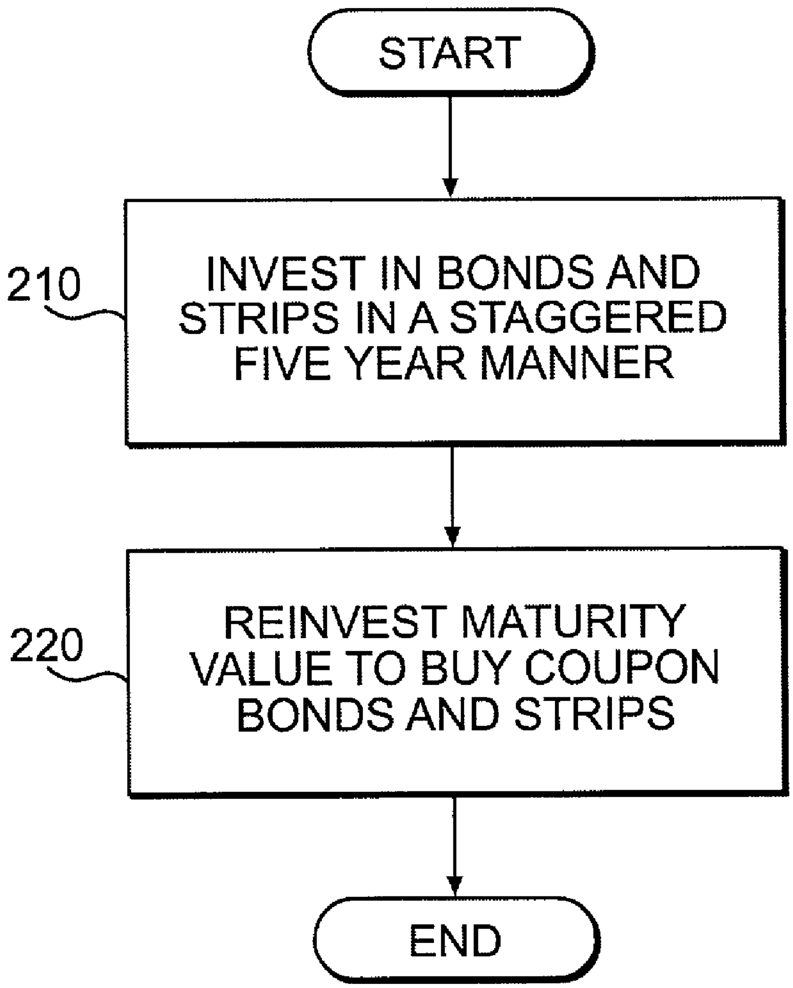
FIG. 2 depicts a flowchart of a general method for inventing funds consistent with the present invention.
Figure 3:
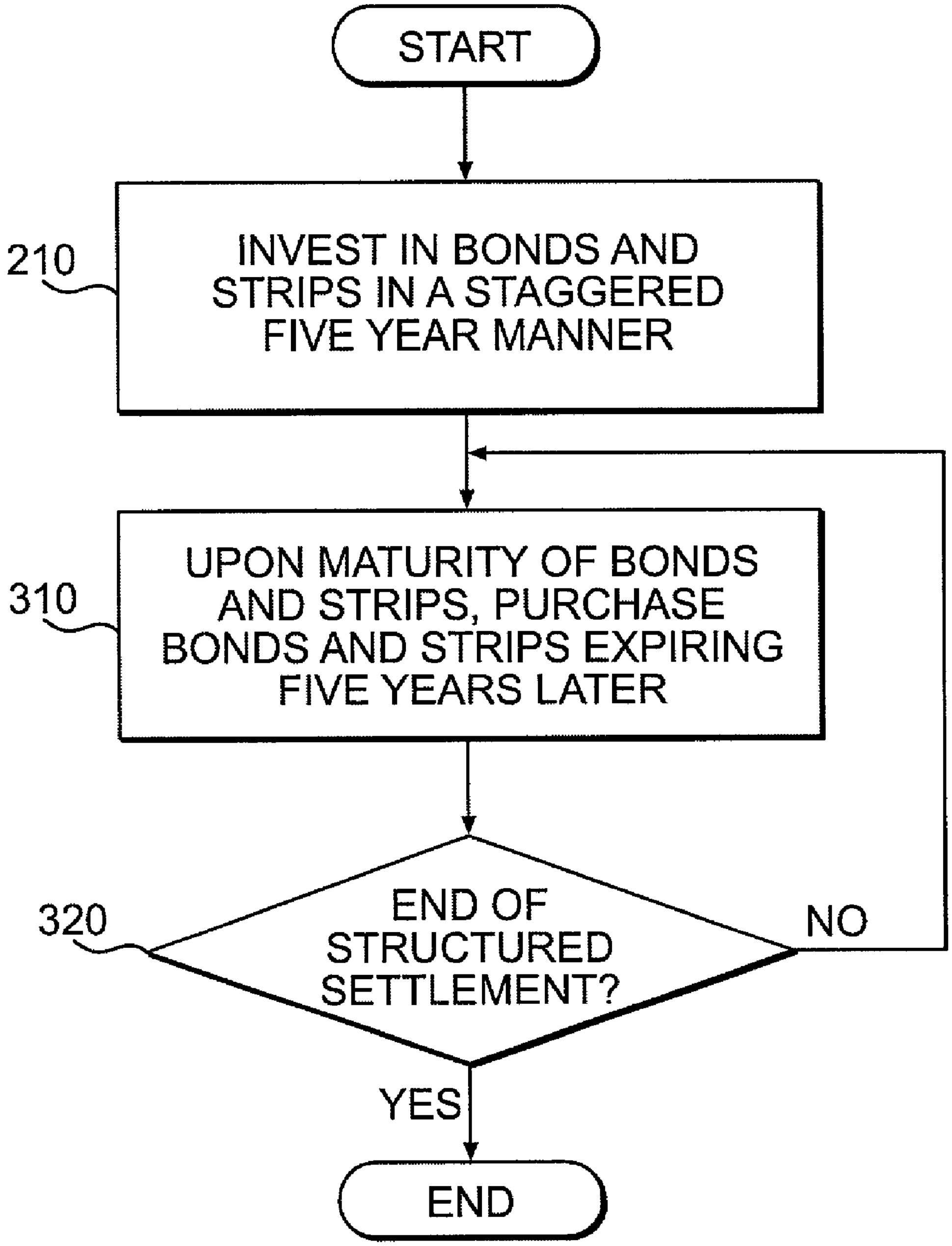
FIG. 3 depicts a flowchart of a specific method for investing funds consistent with the present invention.

The Bonds and Strips are invested in a staggered five-year manner so that after the maturity of the initial bond in five years one fifth of the pool of Coupon Bonds and Strips mature each year over all following five-year periods (FIGS. 2–3 step 210). As each combination of Coupon Bonds and Strips matures, the maturity value is reinvested to buy Coupon Bonds and Strips with a maturity date five years hence, and a combined maturity value will equal 20% of the initial funding amount (FIG. 2, step 220).

For example, in a model where the initial bond matures at the end of the fifth year, the gross maturity proceeds of the Coupon Bonds and Strips maturing in year five will be divided into five parts, each equal to 20% of the initial funding amount. At the end of year six, when the first of these "20%" maturities occurs, Coupon Bonds and Strips maturing five years later in year eleven of the structured settlement, will be purchased. At the end of year seven, the gross maturity proceeds would be used or "rolled over" to purchase Coupon Bonds and Strips maturing five years later in year twelve. The Coupon Bonds and Strips maturing in year eight would likewise be rolled over to purchase Coupon Bonds and Strips maturing five years later in year thirteen. This process would continue for the life of the structured settlement (FIG. 3, step 320).

In one embodiment, an annual rollover commences in year six, and because the bonds are bought at market, 20% of the portfolio each and every year would be purchased at a yield that is appropriate for the economy at that time. The result is a return equivalent to a five-year rolling average of five year Treasury Bonds, with all Bonds being deemed to be purchased in the aftermarket.

Starting at the maturity immediately following the time of death, there would be no further rollover, but instead there would be a distribution of 20% of the funding amount per year for five consecutive years. This would give the estate the ability to pay estate taxes in a very limited period of time, probably no longer than two years. This procedure also solves the problem of the Internal Revenue Service in tracking any of these structured settlements to collect taxes due by lessening the administrative burden for the Internal Revenue Service appreciably, and significantly reducing the interest charged on the unpaid tax.

The procedure outlined above achieves a variable future rate of return that would be consistent with future economic conditions without substantially diminishing yield at inception. Matching of Strips to Coupon Bonds on a large scale is only commercially feasible if implemented automatically because in each case a Coupon Bond will be maturing each year and the maturity value has to be automatically reinvested in a Coupon Bond maturing five years later. If the Coupon Bond being purchased is selling at a premium, then a Strip must also be purchased to bring the maturity value back up to the original cost. This would have to be done via a computer.

Figure 1:
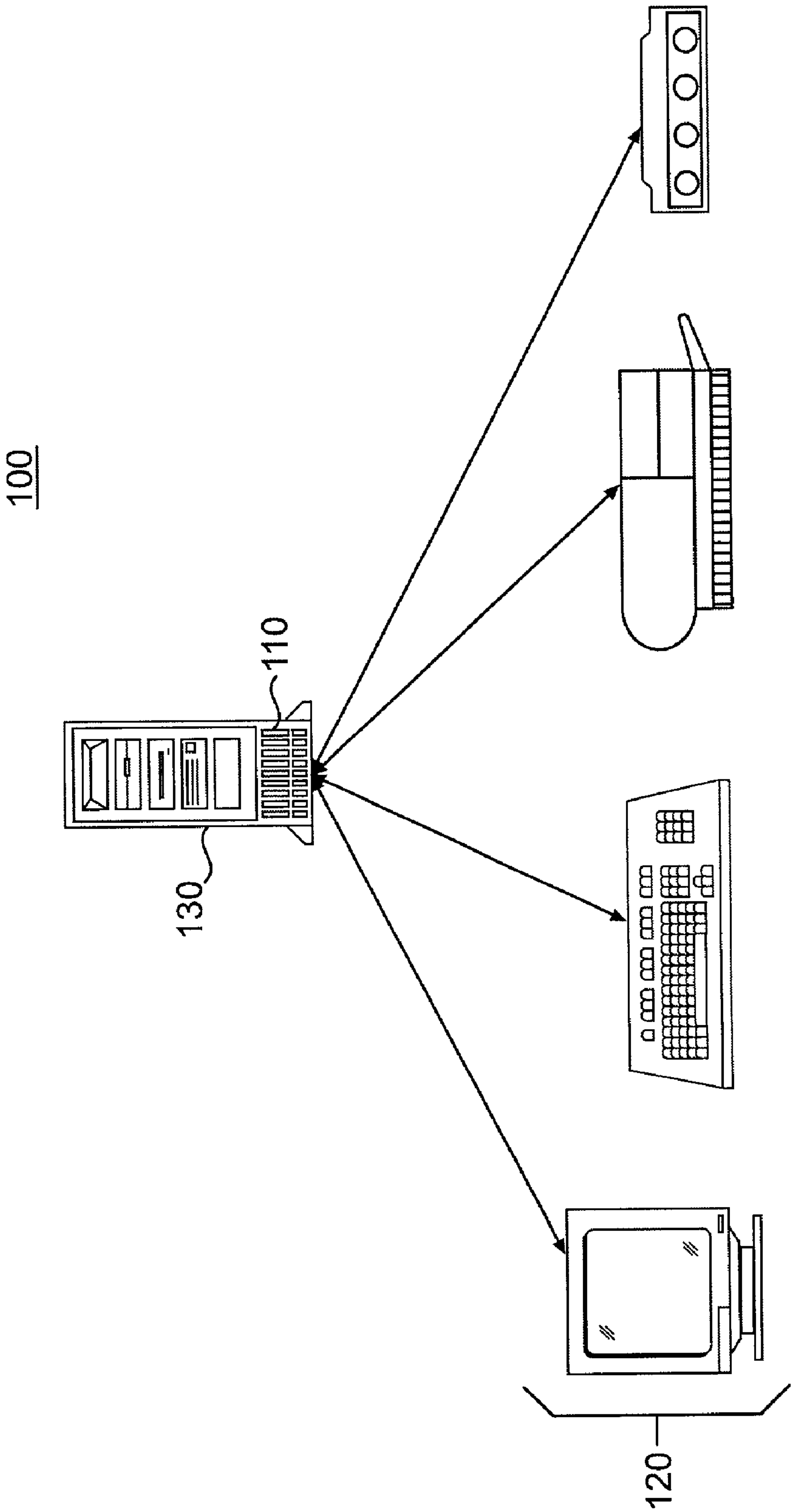
FIG. 1 shows a computer system for executing the procedures consistent with this invention.

FIG. 1 shows such a computer system 100. Memory 110 includes the programs needed to operate procedures consistent with this invention and to hold tables or other data needed by the procedures. Input/output devices 120 include devices to receive information needed about the procedure and to either print out purchase decisions or communicate them, via a modem, to a purchasing agency. Processor 130 operates the procedures consistent with this invention and controls memory 110 and input/output devices 120.

There are two primary structured settlement applications for this formula-driven, bond selection approach. Both use the same five-year rollover already discussed. A structured settlement under Section 130 of the Code requires a combination of Coupon Bonds and Strips balanced by a mathematical formula to overcome any premium paid including a front and load such as any trustee and consulting fees. The bonds ultimately can be purchased so that five consecutive maturity values would each be 20% of the initial finding amount.

Structured settlements under Section 103 of the Code, which provides an exclusion from Federal Income Tax for the income derived from Municipal Bonds (e.g, a "Plaintiff Controlled Structured Settlement" or "PCSS") use Municipal Bonds and Municipal Zero Coupon Bonds, which are similar in nature to Strips. A Municipal Zero Coupon Bond may not always be available with the specific maturity date needed, however, because Zero Coupon Municipal Bonds are not as actively traded. Thus, the maturity value on the Municipal Bond must be supplemented by a sufficient amount of additional money to bring each maturity value up to 20% of the initial finding amount.

Holding back a sufficient amount of money from the annual income will make up for any deficit created by the front end load during the first five years, or on the premium of the bonds purchased in any period, so that the hold back when added to each bond at maturity would bring the maturity value up to an amount equal to 20% of the initial funding amount. For all practical purposes, this approach accomplishes the same thing as the Strip approach, but can be implemented even when there is no Municipal Zero Coupon Bond available that matches the rollover date.

Figure 4:
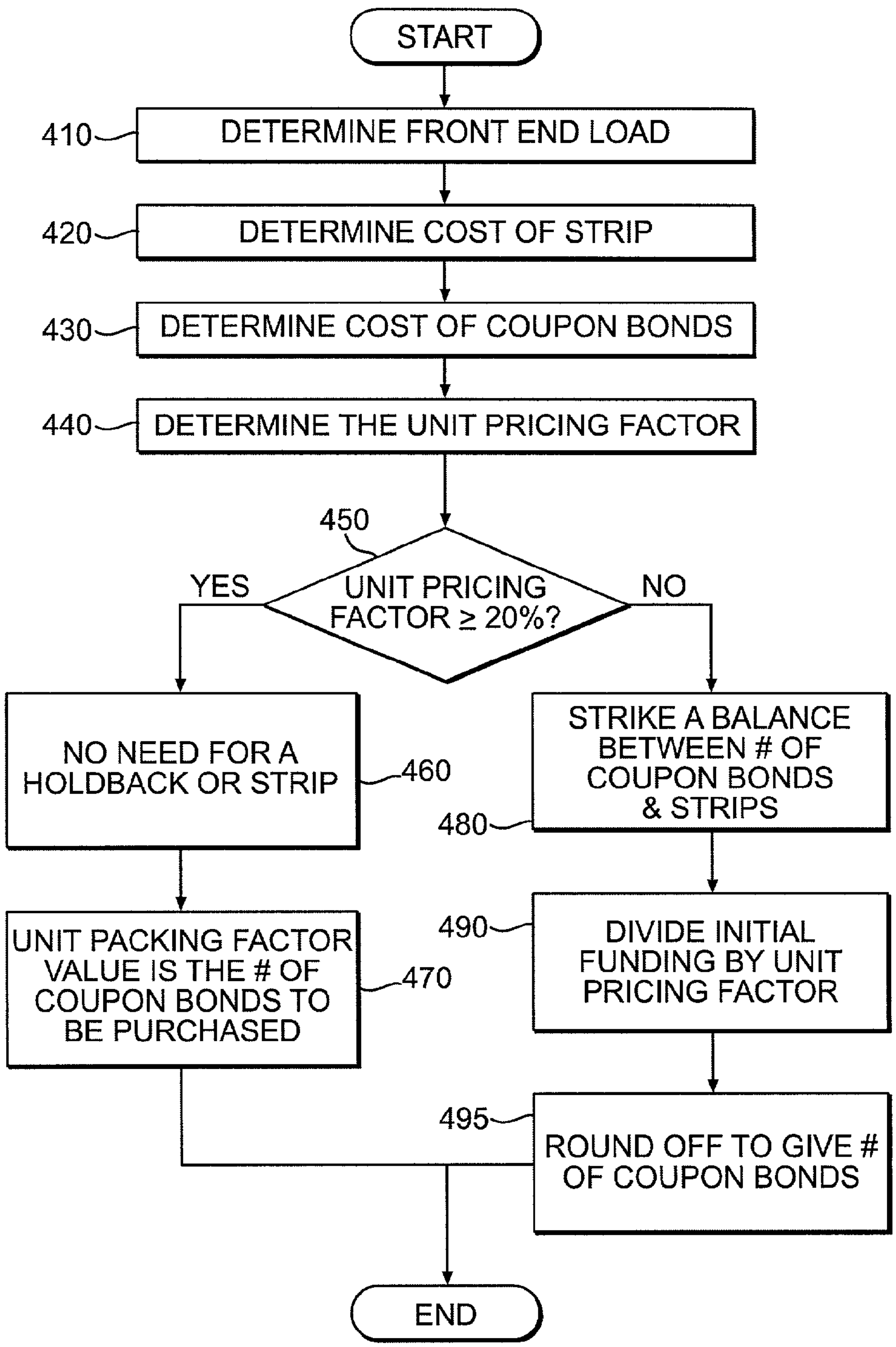
FIG. 4 depicts a flowchart of a method for determining the number of coupon bonds to be purchased consistent with the the present invention.

In all cases, the calculations for the first five years of maturities will include an amount that will enable the bond maturities to overcome any additional monies paid for premium bonds and, within the first five maturities, the entire front end load, which will typically be from 4%–8½% of the initial funding amount. This allows the estate of a plaintiff/injured party to receive a full 100% refund of the initial funding amount. Therefore, the information that computer system 100 needs to implement the funding idea includes:

1. The front-end load to be overcome (FIG. 4, step 410).
2. The cost of each Strip (in the first five bonds this cost would be divided by one minus the load) (FIG. 4, step 420).
3. The cost of each Coupon Bond (in the first five bonds this cost would be divided by one minus the load) (FIG. 4, step 430). In the case of the Coupon Bond however, the cost is not only the price of the bond but also the amount of accrued interest that is attached to the bond on the date of purchase.

The computer would then implement the calculations defined below, in which S equals the cost per Strip (adjusted to reflect any amortization of the front end load); C equals the cost of the Coupon Bond (including any accrued interest to that cost and divided by (one minus the load) if this bond is amortizing a load); and L equals the percentage front end load (i.e., 0.04 to 0.085), then a unit pricing factor, U, can be determined for each bond purchased (FIG. 4, step 440), after making the following determinations:

L=Load=0.065

Sx=Cost of Strip for the first 5 years (Cost of Strip)/(1–0.065)

(Cost of Strip)/0.935

S=Cost of Strip for any rollover

Cx=Cost of Coupon Bond including accrued interest for the first 5 years

=(Cost of Bond)/(1–0.065)

=(Cost of Bond)/0.935

C=Cost of Coupon Bond including accrued interest for any rollover

First Bond maturing in 5 years $$\left(\left(\frac{(Cx-1000)}{(1000-Sx)}\times Sx\right)+Cx\right)=U$$

Rollover (years 6 and later)

$$\left(\left(\frac{(C-1000)}{(1000-S)}\times S\right)+C\right)=U$$

Thus, if 20% of the initial finding amount divided by the unit pricing factor equals a number that is greater than or equal to the 20% of the initial finding amount (FIG. 4, step 450), then there is no need for a holdback or a Strip (FIG. 4, step 460) and that becomes the number of Coupon Bonds to be purchased (FIG. 4, step 470). The objective is not to control bonds purchased at substantial discounts, but just that 20% of the initial funding amount matures each year.

If, however, this approach yields a number that is less than 20% of the initial funding amount then a balance needs to be struck between the number of Coupon Bonds and Strips to be purchased so that the sum of the two, times 1000, equals 20% of the initial finding amount (FIG. 4, step 480). Because it is not possible to purchase a fraction of a Coupon Bond or Strip, it is necessary to round off the numbers to the largest whole number of Coupon Bonds and Strips. One way to determine the number of Coupon Bonds and the number of Strips needed is as follows:

U=Unit Factor From Above×20%

A=Funding Amount

B=Tentative Number of Units (A÷U)

C=B Rounded to Nearest Whole Bond

D=C−1 Unit

E=Trial Cost Balance (C×U)

F=Actual Number of Bonds (If E>A then use 'D'If E<A then use 'C')

G=Actual Number of Strips (If F×1000)≧A use ø; if not, then use (A/1000−F)

H=Total Maturity Value ((F−G)×1000)

I=Actual Cost (F×U)

Hence, 20% of the initial finding amount divided by the unit pricing factor will give a fractional number for the number of Coupon Bonds needed (FIG. 4, step 490). This number then must be rounded off to the nearest whole number of Coupon Bonds (FIG. 4, step 495). For example, if we had a unit pricing factor of $1,120.78 for a particular bond and 20% of the initial funding amount was $200,000, the number of Coupon Bonds to be purchased rounds off to 178 since the unit pricing factor also includes an accommodation for the Strips.

In this example, there must be a $200,000 return of principal and a $178,000 return from the Coupon Bonds. This requires purchase of twenty-two Strips to bring the total maturity value up to $200,000 that was invested. Because the unit pricing factor is higher than the cost of Coupon Bond alone, it is accounting for a proportional cost for the Strip and prorating each to overcome any load or premium. This approach would be viewed and calculated separately for each Coupon Bond in the portfolio.

Figure 5:
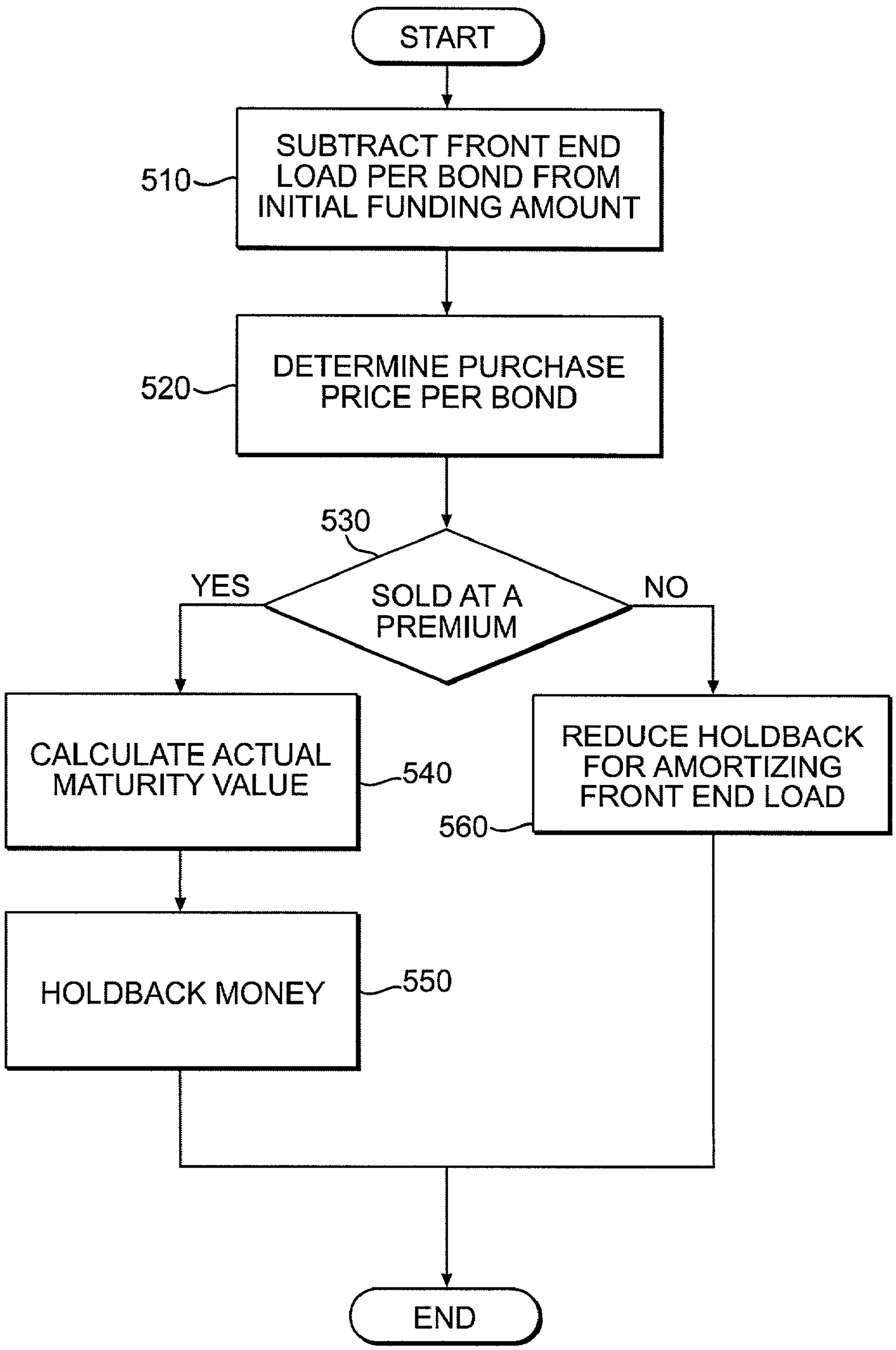
FIG. 5. depicts a flowchart of a method for determining the amount of holdback consistent with the present invention.

To use the Holdback approach instead of the Strip approach, for example for the purchase of Municipal Bonds, the first step would be to subtract the front end load per bond from the initial funding amount (FIG. 5, step 510). Next, the purchase price per bond (FIG. 5, step 520) would be determined to find out if it is selling at a discount, at a premium or par (FIG. 5, step 530). If at a premium, the actual maturity value of the bonds being held maturing at the rate of 20% per year would be calculated (FIG. 5, step 540). Then a sufficient amount of money would be held back from each bond's coupon payment semiannually so that at that bond's maturity, the holdback plus the maturity value would equal a total of 20% of the initial funding amount (FIG. 5, step 550). The holdback would be used to make this leg of the transaction whole so that the amount of money being "rolled over" from the first rollover forward is always equal to 20% of the initial finding amount. Therefore, if F=Initial Funding Amount for each Respective Bond L=Front End Load Px=Premium/Discount on Coupon Bond in Year "x," (Discount would be a Negative Number)

X=Number of Years to Maturity for any Specific Bond then $$Hx(\text{Annual Holdback for Each Specific Bond}) = \frac{\left(\frac{L}{5} + Px\right)}{x} = \frac{(.2\ L + Px)}{x}$$

Assuming F equals the initial funding amount for each respective Bond, L equals the front end load, and Px equals the premium/discount on any bond purchased in dollars for the corresponding year. P1 would be the premium/discount for the first year, and P2 would be the premium for the second year, etc.

For each bond, then, the annual holdback thus equals ((F/5)+Px).) Dividing the initial funding amount five represents the amount allocable to the given bond in question. Dividing the load by five reflects allocating the total front end load on the transaction over five bonds. Px, as explained above, is the actual premium/discount to be paid or received on any bond whose sequenced reference is x. The annual holdback is subtracted from the actual Coupon Interest to be paid by the bonds in question. If the Coupon Interest to be paid is "I" and the net income to be paid is "N," then the formula is N=I−H or for each year x:

Nx=Net Income Per Bond

Ix=Gross Coupon Interest of Bond

Nx=Ix−Hx

If the bond is purchased at a discount, however, the offset for the excess maturity value that a discount would create would reduce the holdback for amortizing the front end load (FIG. 5, step 560). Ultimately, a schedule must be produced automatically to indicate which bonds need to be purchased at which dates.

Situations not encompassing Section 130 of the Code would provide an additional universe of applications. The Plaintiff Controlled Structured Settlement model has at least equivalently broad-reaching applications to providing a financial settlement vehicle for profoundly injured tort victims as does the traditional Section 130 Structured Settlement.

This formula would also be extremely useful in the retirement plan marketplace. Because interest rates are a critical component in determining inflation, the application of this rollover and holdback procedure would give a new retiree the comfort of knowing that they have designed their assets to follow a curve similar to that of future interest rates. Doing this on a consecutive five-year basis, smooths out the "rough edges" of future interest rate scenarios by creating a return that is equivalent to a rolling five-year average of interest rates. Thus, reducing the number of sharp spikes in interest rates or yield or, conversely, reducing the number of sharp declines, will provide a benefit for retirees. Thus, the retirement plan model would be an ideal way to fill the need for future retirees to be satisfied that their income stream would keep up with future economic climates while not having to rely on the personal acumen of any particular portfolio manager.

In addition, this procedure could be used to create a Municipal Bond Money Market Mutual Fund and a United States Treasury Bond Money Market Mutual Fund, as well as U.S. Treasury Bond and Municipal Bond Mutual Funds. Finally, the formula could be applicable to any general money management model and specifically to the management of trust funds where interest earnings are of paramount importance.

What is claimed is:

1. A method of automatically managing an initial funding amount to achieve a future rate of return that will be consistent with future economic conditions without diminishing principle, comprising the steps, performed by a data processor, of:

receiving input values for the initial funding amount, a cost of a primary term investment vehicle, a cost of a secondary term investment vehicle and any front end load for the primary and secondary term investment vehicles;

creating an initial investment structure by splitting the initial funding amount into a predetermined number of portions, spreading the portions over a predetermined number of initial investment terms, and dividing each portion between the primary and secondary term investment vehicles such that for each term, the sum of the values for the primary and secondary term investment vehicles at the end of the corresponding term equals the portion for that term, the step of creating the initial investment structure including the substeps of calculating the amount of the portions needed to cover any front end load, determining a factor to divide each portion, less the calculated front end load, of the initial funding amount between the primary and secondary investment vehicles, and creating communications to implement the initial investment structure; and maintaining an ongoing investment structure for an additional term as each portion of the initial funding amount matures at the end of the corresponding investment term by determining a reinvestment of gross proceeds for an additional investment term, the step of maintaining the investment structure including the substeps of receiving updated input values for the cost of the primary investment vehicle and the cost of the secondary investment vehicle, matching the secondary investment vehicle to the primary investment vehicle to maintain a consistent level of reinvestment, and scheduling the automatic purchasing of primary and secondary term investment vehicles as determined after matching.

2. The method of claim 1, wherein the substep of maintaining the investment structure further includes the substep of stopping reinvestment at the occurrence of a predetermined event.

3. The method of claim 1, wherein the step of receiving input values for the cost of the primary and secondary investment vehicles includes the substep of receiving values for the costs of a United States Treasury Bond and a United States Treasury Zero Coupon Bond.

4. The method of claim 1, wherein the step of receiving input values for the cost of the primary and secondary investment vehicles includes the substep of receiving values for the costs of a Municipal Bond and a holdback account.

* * * * *